United States Patent [19]
Reed

[11] 3,972,433
[45] Aug. 3, 1976

[54] SELF LOADING AND CARRYING APPARATUS

[76] Inventor: Henry W. Reed, 1072 Stanley Drive, Clio, Mich. 48420

[22] Filed: Aug. 7, 1974

[21] Appl. No.: 495,403

[52] U.S. Cl............................ 214/450; 224/42.1 H
[51] Int. Cl.²............................................ B60R 9/00
[58] Field of Search............ 214/450, 512, 505, 85; 224/42.1 H; 296/1 A

[56] References Cited
UNITED STATES PATENTS

| | | | |
|---|---|---|---|
| 2,103,669 | 12/1937 | Francis | 296/1 A |
| 2,621,814 | 12/1952 | Lisota | 214/505 |
| 2,765,940 | 10/1956 | Nelson | 214/450 |
| 3,460,693 | 8/1969 | Oldham | 214/450 |
| 3,480,166 | 11/1969 | Abbott | 214/450 |
| 3,726,423 | 4/1973 | Miron | 214/505 |
| 3,871,540 | 3/1975 | Jenkins | 214/450 |
| 3,872,989 | 3/1975 | Smithson et al. | 214/450 |

FOREIGN PATENTS OR APPLICATIONS
784,564   5/1968   Canada.............................. 214/450

*Primary Examiner*—Albert J. Makay
*Assistant Examiner*—Ross Weaver
*Attorney, Agent, or Firm*—Fisher, Gerhardt & Groh

[57] ABSTRACT

A self-loading and carrying apparatus has a frame suitable to be attached to a vehicle and includes an assembly comprising a first supporting member pivoted on the frame and a second supporting member telescopically carried by the first member. A load carrying platform is slidable on the second and first supporting members. Anti-friction rollers support the platform on the first member and reel and pulley means are provided to move both the platform and the second supporting member relative to the first member. Lifting means are also provided to aid in raising the assembly to a horizontal position and hold the same locked in such position.

3 Claims, 7 Drawing Figures

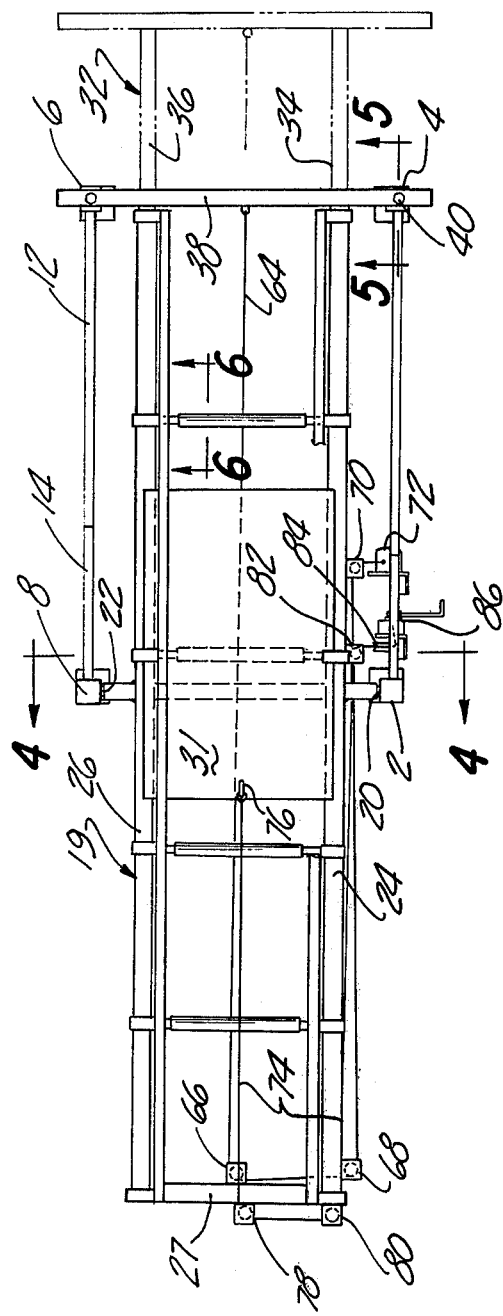
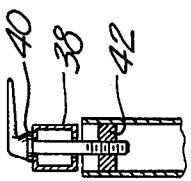
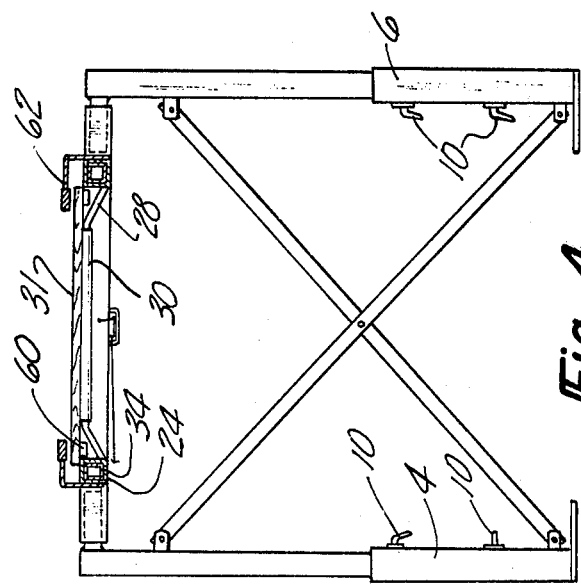

SELF LOADING AND CARRYING APPARATUS

This invention relates to apparatus for loading and carrying loads on vehicles and more particularly to an apparatus for loading and carrying boats or snowmobiles on vehicles.

Because of the difficulty in loading large, heavy recreational devices such as boats and snowmobiles, such devices are usually carried on trailers behind trucks or cars. In order to load such devices directly on a vehicle it is either necessary to have several persons load the device or, alternatively, expensive complicated apparatus must be provided for one person to load the boat or snowmobile on the vehicle.

It is an object of the present invention to provide a complete self-loading and carrying apparatus that can be mounted on a conventional pick-up truck.

A further object is to provide such an apparatus that will permit one person to safely load and unload a large boat on to a vehicle.

These and other objects and advantages will be readily apparant to those skilled in the art from the following drawings in which:

FIG. 3 is a top view of the apparatus;

FIG. 4 is a cross-sectional view taken on the line 4—4 of FIG. 3;

FIG. 5 is another cross-sectional view taken on the line 5—5 of FIG. 3 and showing the locking mechanism;

FIG. 6 is still another view taken on the line 6—6 of FIG. 3 and showing the roller construction.

Figure 1:
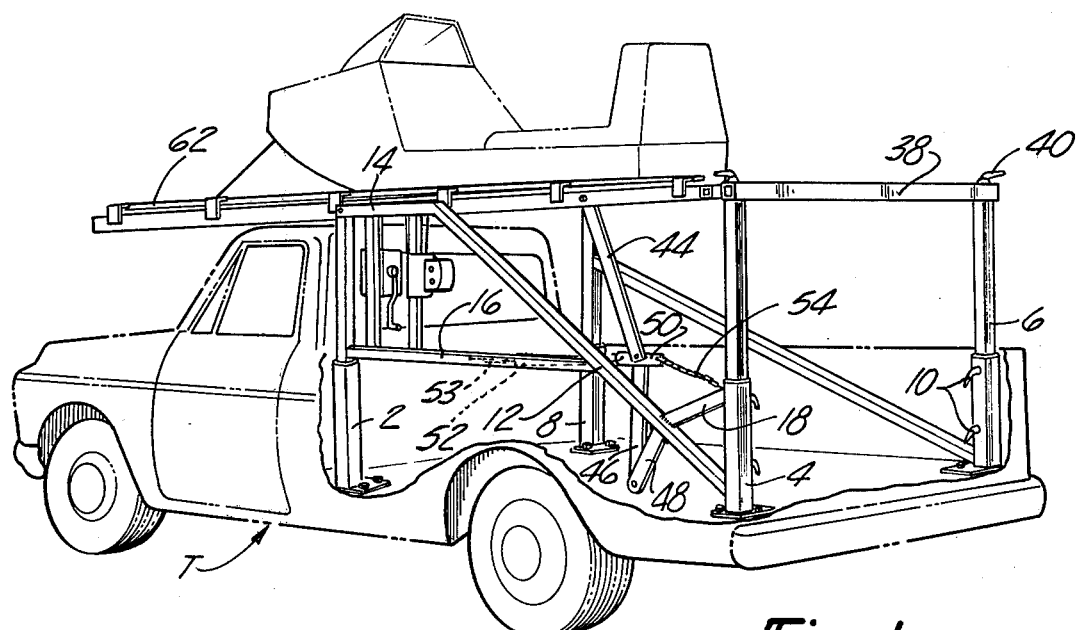
FIG. 1 is a perspective view of the apparatus shown mounted on a pick-up truck and in a load carrying position.

Referring to the figures, a preferred embodiment is shown mounted on a conventional pick-up truck T. In FIG. 1, the sides of the truck are broken away. The loading and carrying device includes a supporting frame assembly including four vertical members 2, 4, 6 and 8, each of which comprises a pair of telescoping square members, the lower members being attached by flange members to the bed of the truck. The height of the loading apparatus is adjustable by moving the upper member of each leg relative to the lower. Lock members 10 act to lock the two portions of each leg together in adjusted position.

The supporting frame assembly further includes inclined side support members 12 welded or otherwise secured to the rear legs near the bottom thereof. The members 12 are formed to include upper horizontal portions 14 that are likewise welded to the top portions of the front legs. Additional members 16 and 18 provide rigidity and strength to the frame.

A main or primary load carrying support assembly, generally indicated 19, is pivotally mounted at its center at 20 and 23. Trunnion members 28 and 30 are welded to the outside of the tubular members to form the pivot support. The side tubular members 24 and 26 are connected at the front cross-piece 27 and by a plurality of longitudinally spaced rods 28 welded to the side members. The rods 28 are bent as shown in FIG. 4 so that the central portion is at a level at least as high as the tops of the tubular members 24 and 26. A loose fitting tube 30 surrounds the central portion of each rod and acts as an anti-friction roller to slideably carry a platform member 31 as seen in FIG. 4.

A secondary load carrying support, generally indicated 32, includes another pair of elongated tube members 34 and 36 telescoping into the tube members 24 and 26 respectively. The tube members 34 and 36 are connected by a cross-piece 38 secured thereto and extending laterally beyond the tubes. When the tubes 34 and 36 of the secondary support assembly 32 are fully telescoped into the tubes 24 and 26 of the primary support assembly 19, the outer ends of the cross-shaft 38 are directly over the rear legs 4 and 6. The height of the rear legs is normally adjusted so that there is a clearance between the tops of the same and the cross-member.

The cross-member 38 carries locking screw member 40 that can be threaded into inserts 42 fixed inside of the upper member of the legs 4 and 6. As the member 40 is tightened, the rear portion of both the primary support assembly 19 and secondary support assembly 32 are forced downward slightly. This insures a tight rigid construction during travel of the vehicle.

In order to aid in raising the primary and secondary support assemblies a lifting means is provided comprising a toggle linkage. The linkage includes an upper link member 44 pivoted at its upper end to the tube 24 and at its lower end to the top of a second lower link 46. The lower link 46 is pivotally supported at its lower end on a bracket arm 48 secured to the frame member 12. A central operating link member 50 is connected at the pivot connection between the upper and lower links. One end of the link 50 has an aperture receiving one end of a coil spring 52. The other end of the spring 52 engages one end of a turn buckle 53 attached to the frame member 16.

Figure 2:
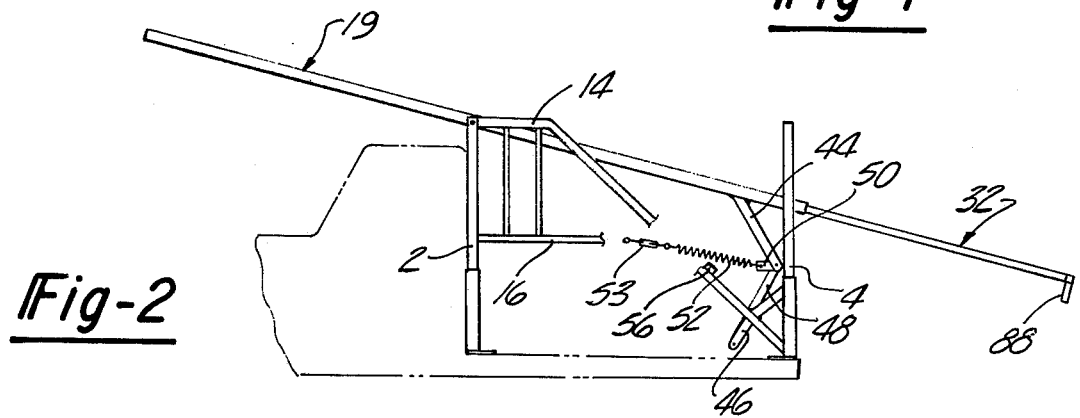
FIG. 2 is an elevational view of certain portions of the apparatus in a loading position.

When the assembly 19 is pivoted down to the position shown in FIG. 2 the spring 52 is extended. When the assembly is pivoted back up again toward the horizontal position of FIG. 1, the spring aids in lifting the load. The turn buckle 53 aids in adjusting the spring tension so that a particular load can be easily lifted without being raised too fast.

Also attached to the link 50 is a check chain 54. The chain limits the pivotal movement of the assembly 19 so that the front portion does not hit the top of the truck cab when the assembly and load thereon is pivoted upward by the toggle linkage having straightened by the spring 52. A bumper element 56 made of rubber, or the like, is attached to the frame member 21 to be contacted by the link 50 to cushion the impact of the weight of the moving load and support when reaching their horizontal position.

The load such as a boat or snowmobile, or several snowmobiles, are carried on the previously mentioned platform 31. The platform 31 has a width equal to the distance between the tubes and slides on the top of the tubes 34 and 36 of the secondary support assembly 32. The platform 31 is guided on these tubes by guide blocks 60 secured to the underside of the platform. The primary support assembly 19 has additional guide rails 52 which overlay the platform as shown in FIG. 4 and prevent the platform 31 and load thereon from bouncing upward when the vehicle is traveling. The platform 31 when it is over the primary assembly rides on the roller members 30.

The secondary support assembly 32 and platform 31 are each moved forward by a cable and pulley means and are permitted to move downward and rearwardly by gravity. As seen in FIG. 3, a cable 64 is attached to the cross-piece 38 on the secondary support member. The cable 64 passes around in a pair of pulleys 66 and 68 on the front cross-piece 27 portion of the primary pivoted support 19. The cable 64 then runs rearward to another pulley 70 then to a reel device 72 shown as an electrically operated apparatus. The reel could obviously be constructed to be manually actuated.

A second cable 74 is attached to the platform 31 at 76. The cable 74 passes around a pulley 78 and a pulley 80, both carried by the primary assembly 19 as well as a pulley 82. The cable is wound on a second reel device 84 operated by a manually cranked mechanism 86.

Operation of the device of FIGS. 1 to 6 will now be described. To load a device such as a snowmobile, the lock devices 40 are loosened permitting the secondary assembly 32 to spring upward slightly from the deflected locked position. The secondary assembly 32 is then pulled rearwardly by hand until the overhanging weight overcomes the force of spring 52 acting through the toggle linkage. The primary assembly 19 then tips and tilts about its pivot 20 (FIG. 2) and legs 88 on the extended assembly 32 touch the ground. During the extension of assembly 32 the reel 72 is permitted to unwind by releasing a ratchet lock mechanism, not shown.

The platform 31 is then allowed to roll downwardly and rearwardly by releasing a similar ratchet lock mechanism on reel 84. The initial movement of the platform is over the rollers 30 and then directly on the tubes 34 and 36 of the secondary assembly 32. The guide blocks 60 on the underside of the platform 31 act to guide the platform between the tubes 34 and 36.

The device to be loaded, such as a snowmobile, is driven onto the platform. The reel 84 is operated to pull up the platform and load thereon, until the load is centered over the pivot 20. Reel 72 is then operated by its electric motor to cause cable 64 to pull the secondary assembly 32 up and into telescopic relationship with the primary assembly 19. The toggle mechanism aids in lifting and pivoting the combined assemblies to their horizontal position. The handles 40 are then turned to tighten down the assembly on top of the rear legs 4 and 6. The load can be secured to the platform by any suitable means.

If two snowmobiles are to be loaded and carried, a pair of platforms can be provided with the rear platform connected as by a hinge to the front platform. One snowmobile is then driven on the front platform and the other on the rear. The cable 64 then is operated to pull both platforms and loads up to the load carrying centered position.

Figure 7:
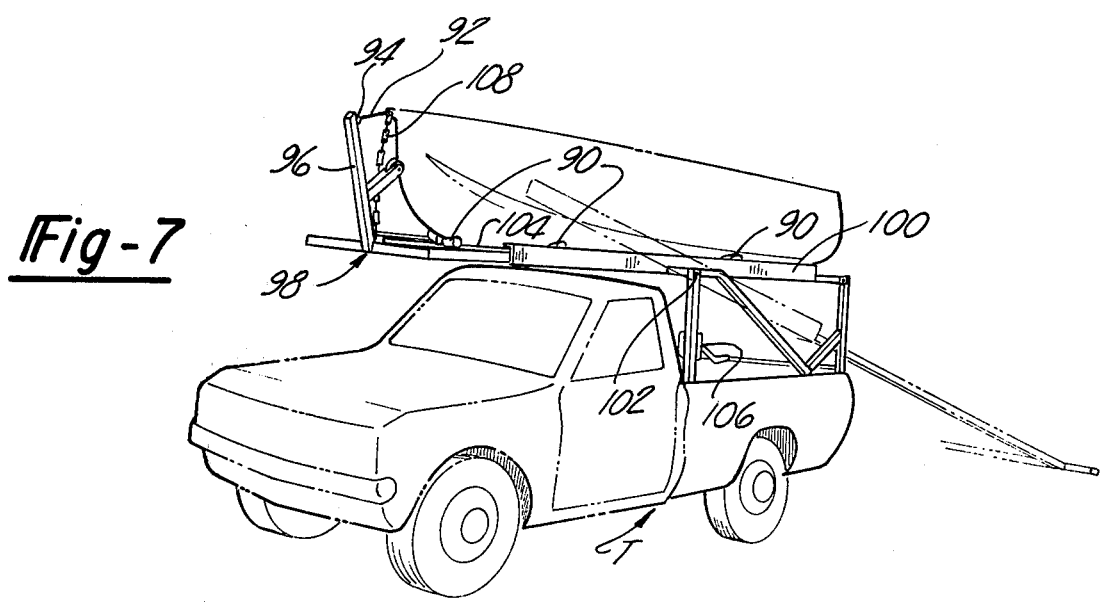
FIG. 7 is a view of a modified apparatus shown on a truck and holding a boat.

If a boat is to be carried, the platform 31 can be made to carry a plurality of rollers 90 as shown in FIG. 7. In FIG. 7 a modified assembly especially suitable for boats utilizes a single cable 92 connected to the boat that passes over a pulley 94 carried on a mast member 96 attached to the front of the secondary support assembly 98. This support assembly telescopes into the primary assembly 100 which is pivoted at 102 in the manner of the device of FIGS. 1–6. A platform 104 having the rollers 90 receives the boat. The platform and boat are pulled upward by the cable 92 operated by a reel assembly 106. A safety chain 108 is attached between the boat and the secondary assembly 98 so as to prevent an undue load on the cable when the assembly and load thereon are extended and lowered towards the ground. The inertia of the boat traveling down could snap the cable when the rear of the supporting frame hits the ground, however, the chain 108 takes the load off the cable. The chain 108 is then disconnected and the reel 106 operated to permit the platform 104 and boat to be lowered to the ground or into the water.

If is understood that changes and modifications can be made without departing from the invention. For example, any of the cable and reels can be operated either by manual means, electric means or otherwise. The invention can be applied to other types of carrying vehicles than the type shown and other types of loads can be loaded and carried.

I claim:

1. A self-loading apparatus for loading and carrying a load on a vehicle including the combination of a supporting frame adapted to be mounted on the vehicle and having forward and rearward support portions, a first elongated load supporting member having an intermediate portion thereof pivotally mounted on said forward frame portion for movement between a horizontal and a tilted position, a second elongated load supporting member slidably carried on the first elongated supporting member and longitudinally movable to the rear of the first elongated member from a retracted to an extended position in which said second member is engageable with the ground, a third load supporting member slidably carried on the first and second supporting members for movement to a position on said first member, means for moving said second member relative to the first member, and means on said second supporting member for movement into engagement with said rearward support portion upon movement of said second supporting member to its retracted position for supporting the first member in its horizontal position.

2. The self-loading apparatus of claim 1 wherein said third elongated member comprises a platform and means are provided to move the platform on said second elongated member and said first elongated member.

3. The self-loading apparatus of claim 2 wherein said first supporting member carries guide means to guide the platform on said first member and said platform carries guide means to guide the same on said second member.

* * * * *